United States Patent
Wittmar et al.

(10) Patent No.: US 11,447,583 B2
(45) Date of Patent: Sep. 20, 2022

(54) HIGH MOLECULAR WEIGHT POLY(METHACRYLIC ACID)

(71) Applicant: Alcon Inc., Fribourg (CH)

(72) Inventors: Stephan Wittmar, Erlenbach (DE); Thomas Schmidt, Bautzen (DE); Justyna Justynska-Reimann, Oppenheim (DE); Claudio Hofmann, Karlstein am Main (DE)

(73) Assignee: Alcon Inc., Fribourg (CH)

(*) Notice: Subject to any disclaimer, the term of this patent is extended or adjusted under 35 U.S.C. 154(b) by 0 days.

(21) Appl. No.: 17/229,513

(22) Filed: Apr. 13, 2021

(65) Prior Publication Data

US 2021/0230321 A1   Jul. 29, 2021

Related U.S. Application Data

(62) Division of application No. 16/752,998, filed on Jan. 27, 2020, now Pat. No. 11,001,652.

(60) Provisional application No. 62/797,555, filed on Jan. 28, 2019.

(51) Int. Cl.
| | | |
|---|---|---|
| *C08F 120/06* | (2006.01) | |
| *C08F 20/18* | (2006.01) | |
| *C08F 2/10* | (2006.01) | |
| *C08K 5/23* | (2006.01) | |
| *C08K 5/372* | (2006.01) | |

(52) U.S. Cl.
CPC ............... *C08F 20/18* (2013.01); *C08F 2/10* (2013.01); *C08K 5/23* (2013.01); *C08K 5/3725* (2013.01)

(58) Field of Classification Search
CPC .... C08F 2/38; C08F 2500/03; C08F 2500/01; C08F 20/06; C08F 120/06
See application file for complete search history.

(56) References Cited

U.S. PATENT DOCUMENTS

| | | | | |
|---|---|---|---|---|
| 3,932,560 | A * | 1/1976 | Franklin ................. | C08F 20/06 525/518 |
| 4,839,417 | A * | 6/1989 | Suetterlin ............. | C08F 220/06 526/86 |
| 6,087,418 | A * | 7/2000 | Yamashita .......... | C04B 24/2647 524/4 |
| 2003/0149206 | A1 * | 8/2003 | Tomita ................ | C08F 220/286 526/90 |
| 2004/0110861 | A1 * | 6/2004 | Shorbu ................... | C08F 20/06 522/184 |

OTHER PUBLICATIONS

Pelet, Macromolecules 2009, 42, 1494-1499. (Year: 2009).*

* cited by examiner

*Primary Examiner* — Robert C Boyle
(74) *Attorney, Agent, or Firm* — Jian Zhou

(57) ABSTRACT

The invention is generally related to a process for producing a relatively high molecular weight poly(methacrylic acid) ("PMAA") in a water-based system. The process of the invention comprises polymerization of from about 1% to about 20% by weight of methacrylic acid in water or a water-based system in the presence of thiol compound and an azo radical initiator under controlled reaction and process conditions. A process of the invention can be easily scaled up into the pilot scale for producing large quantities of high molecular weight PMAAs. The invention is also related to high molecular weight poly(methacrylic acid)s obtained according to a process of the invention.

15 Claims, No Drawings

HIGH MOLECULAR WEIGHT POLY(METHACRYLIC ACID)

This application is a divisional application of U.S. patent application Ser. No. 16/752,998 filed 27 Jan. 2020, which claims the benefit under 35 USC § 119 (e) of U.S. provisional application No. 62/797,555 filed 28 Jan. 2019, herein incorporated by reference in its entirety.

The present invention generally relates to high molecular weight poly(methacrylic acid) and process for producing the same.

BACKGROUND

A new class of soft contact lenses, water gradient silicone hydrogel contact lenses, have been developed and successfully introduced as daily-disposable contact lenses, DAILIES® TOTAL1® (Alcon) in the market. This new class of silicone hydrogel contact lenses is characterized by having a water-gradient structural configuration, an increase from 33% to over 80% water content from core to surface (U.S. Pat. No. 8,480,227). This unique design can deliver a highly-lubricious and extremely-soft, water-rich lens surface that in turn provide superior wearing comfort to patients. Such soft contact lenses can be produced according to a cost-effective approach that is described in U.S. Pat. No. 8,529,057 and involves a step of crosslinking and covalently attaching of a water-soluble highly-branched hydrophilic polymeric material onto lens surfaces to form surface gels.

According to U.S. Pat. No. 8,529,057, contact lenses having a water-gradient structural configuration and a soft, water-rich, and lubricious surface can be produced by forming an anchoring layer (i.e., base coating) on each contact lens by dipping the contact lenses in a coating solution of a polyanionic polymer and then covalently attaching a water-soluble highly-branched hydrophilic polymeric material onto the anchoring layer directly in a lens package during autoclave. The water-soluble highly-branched hydrophilic polymeric material is prepared by partially reacting a polyamidoamine-epichlorohydrin (PAE) with a wetting agent, at various concentration ratio of PAE to the wetting agent and at a reaction temperature for a given reaction time, to achieve a desired lubricity of the surface gels while minimizing or eliminating surface defects (e.g., surface cracking, etc.).

US2016/0326046A1 discloses approaches for reducing water gradient contact lenses' susceptibility to deposition and accumulation of polycationic antimicrobials (e.g., polyhexamethylene biguanide, Polyquaternium-1 (aka PolyQuad®), or the like, which are commonly found in most multipurpose lens care solutions) by using polymethacrylic acid (PMAA) as polyanionic material for forming a thin PMAA base coating, then doping the PMAA base coating with a low molecular weight polyamidoamine-epichlorohydrin (PAE), and finally covalently attaching a water-soluble highly-branched hydrophilic polymeric material onto the PAE-doped PMAA base coating directly in a lens package during autoclave to form a crosslinked hydrophilic coating. In order to achieve relatively higher durability of the crosslinked hydrophilic coating, PMAA advantageously has a relatively high molecular weight, e.g., a weight average molecular weight of at least about 400,000 Daltons, for forming a stable base coating.

U.S. Pat. No. 5,494,983 discloses a process for anionic polymerization of acrylic and/or methacrylic acid derivatives or their ammonium salts using ammonium salts of resonance-stabilized nitrogen anions as initiators preferably in an aprotic solvent. Polymers prepared in the working examples of this patent have a relatively low weight average molecular weight (Mw), less than 25,000 Daltons.

U.S. Pat. No. 6,310,156 discloses a low molecular weight (meth)acrylic acid polymer (Mw: 3,000 to 15,000 Daltons) obtained by conducting a polymerization reaction using 60 mol % or more of a hydrophilic monomer containing (meth)acrylic acid and a combination of at least one kind of persulfate salts and at least one kind of bisulfite salts as an intiator series under conditions that a pH is smaller than 5 and a degree of neutralization is smaller than 40 mol %.

Therefore, there is still a need for a process for producing high molecular weight PMAA in a large scale.

SUMMARY OF THE INVENTION

The invention, in one aspect, provides a process for producing a poly(methacrylic acid) having a weight average molecular weight of at least about 200,000 Daltons, comprising the steps of: (1) obtaining a water-based polymerization composition which comprises (a) methacrylic acid in an amount of from about 1% to about 20% by weight relative to the water-based polymerizable composition, (b) at least one azo-containing radical initiator which has a water solubility of at least 0.05 gram per 100 g of water at 25±3° C. and a 10-hour half life temperature of from about 40° C. to about 90° C., (c) a thiol-containing compound as a chain-transferring agent, and (d) water, wherein the water-based polymerizable composition has a pH of from about 3.0 to about 4.5, wherein the mole ratio of component (a) to component (b) is at least about 800 while the molar ratio of component (b) to component (c) is from about 1 to about 3.0; and (2) polymerizing methacrylic acid in the water-based polymerizable composition at a temperature of from about 40° C. to about 90° C. to obtain the poly(methacrylic acid).

The invention, in another aspect, provides a poly(methacrylic acid) having a weight average molecular weight of at least at least about 200,000 Daltons (preferably at least about 400,000 Daltons, more preferably at least about 600,000 Daltons, even more preferably at least about 800,000 Daltons), a polydispersity index (PDI) of from about 2.0 to about 3.0, and a hydroxyethylthio group at an end terminal.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material. A person skilled in the art knows very well how to make contact lenses (either non-silicone hydrogel contact lenses or silicone hydrogel contact lenses). For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses.

A "soft contact lens" refers to a contact lens which has an elastic modulus (i.e., Young's modulus) of less than 2.5 MPa.

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C< group. Exemplary ethylenically unsaturated groups include without limitation (meth)acryloyl

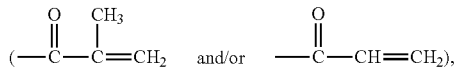

allyl, vinyl, styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the weight-average molecular weight unless otherwise specifically noted or unless testing conditions indicate otherwise.

A skilled person knows how to determine the molecular weight of a polymer according to known methods, e.g., GPC (gel permeation chromatography) with one or more of a refractive index detector, a low-angle laser light scattering detector, a multi-angle laser light scattering (MALLS) detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

For example, the number and weight average molecular weights of a high molecular weight hydrophilic polymer can be determined by GPC/RI (refractive index)/LS (light scattering) method under the following conditions:

Columns: 2× Waters Ultra-Hydrogel Linear 300×7.8 mm column set

Mobile Phase: 0.2M sodium nitrate and 0.02% (w/w) sodium azide (aqueous) for multi-angle laser light scattering (MALLS)

Temperature: 25° C. MALLS

MALLS Detector: Waters Alliance e-2695 with RI/LS (Wyatt DAWN)

Flow Rate: 0.5 mL/min (nominal)

Injection Volume: 0.100 mL

Standards: poly(ethylene glycol), poly(ethylene oxide), poly(acrylamide) from American Polymer Standard Corporation; poly(saccharide) from Polymer Laboratories Sample preparation: 90° C. for 30 min in aqueous mobile phase pre-filtered through 0.45 uM syringe filter (HT Tuffryn membrane, PALL, PN 4497T) into auto sampler vials A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "water-based solution" interchangeably refers to a solution which is a homogeneous mixture consisting of a water-based solvent and one or more solutes dissolved in the water-based solvent. A "water-based solvent" is intended to describe a solvent system which consists of at least about 60%, (preferably at least about 70%, more preferably at least about 80%, even more preferably at least about 90%, in particular at least about 95%) by weight of water and at most 40% (preferably about 30% or less, more preferably about 20% or less, even more preferably about 10% or less, in particular about 5% or less) by weight of one or more organic solvents relative to the weight of the solvent system.

The invention is generally related to a process for producing a relatively high molecular weight poly(methacrylic acid) ("PMAA"). The invention is partly based on the discovery that high molecular weight non-cross-linked methacrylic acid polymers can be synthesized by a radical polymerization of a water-based polymerizable composition including methacrylic acid and selection and combination of reaction and process conditions can allow for the formation of defined high molecular weigh PMAAs. The reaction and process conditions to be selected and combined include, mercaptoethanol as a chain transfer agent (CTA), an azo-containing initiator, the concentration of vinylic monomer(s) (e.g., methacrylic acid), the molar ratios of the vinylic monomer to the CTA, the molar ratio of the CTA to the azo-containing initiator, the polymerization temperature, the pH of the water-based polymerization composition (i.e., the degree of neutralization of methacrylic acid), and the type of cationic ions (e.g., Na$^+$, NH$_4^+$ and K$^+$). A process of the invention can be easily scaled up into the pilot scale for producing large quantities of high molecular weight PMAAs.

The invention, in one aspect, provides a process for producing a poly(methacrylic acid) having a weight average molecular weight of at least about 200,000 Daltons (preferably at least about 400,000 Daltons, more preferably at least about 600,000 Daltons, even more preferably at least about 800,000 Daltons), comprising the steps of:

(1) obtaining a water-based polymerization composition which comprises
(a) methacrylic acid in an amount of from about 1% to about 20% by weight (preferably from about 1.5% to about 15%, more preferably from about 2% to about 10%, even more preferably from about 3% to about 8% by weight) relative to the water-based polymerizable composition,
- (b) at least one azo-containing radical initiator which has a water solubility of at least 0.05 gram per 100 g of water at 25±3° C. and a 10-hour half life temperature Q of from about 40° C. to about 90° C. (preferably from about 40° C. to about 80° C., more preferably from about 40° C. to about 70° C., even more preferably from about 40° C. to about 65° C.),
- (c) a thiol-containing compound as a chain-transferring agent, and
- (d) water,
  wherein the water-based polymerizable composition has a pH of from about 3.0 to about 4.5 (preferably from about 3.0 to about 4.2, more preferably from about 3.0 to about 3.7),
  wherein the mole ratio of component (a) to component (b) is at least about 800 (preferably at least about 2000, more preferably at least about 2500, even more preferably at least about 3000) while the molar ratio of component (b) to component (c) is from about 1 to about 3.0 (preferably from about 1.05 to about 2.5, more preferably from about 1.1 to about 2.0, even more preferably from about 1.15 to about 1.5); and
- (2) thermally polymerizing methacrylic acid in the water-based polymerizable composition at a temperature of from about 40° C. to about 90° C. (preferably from about 45° C. to about 75° C., more preferably from about 45° C. to about 65° C.) to obtain the poly(methacrylic acid).

In accordance with the invention, the amount of methacrylic acid the water-based polymerizable composition is selected for producing a high molecular weight PMAA in a relatively high yield under process conditions for large-scale production. It is found that when the concentration of methacrylic acid is too high, the molecular weight and yield of obtained PMAAs will be reduced. The polymerizable composition may become too viscous for processing.

An azo-containing radical initiator is a free radical initiator containing an azo moiety (*—N=N—*). Any azo-containing radical initiators can be used in the invention, so long as it has a water solubility of at least 0.05 gram per 100 g of water at 25±3° C. and a 10-hour half life temperature of from about 40° C. to about 90° C. (preferably from about 40° C. to about 80° C., more preferably from about 40° C. to about 70° C., even more preferably from about 40° C. to about 65° C.). Examples of preferred azo-containing radical initiators include without limitation VA-044 (2,2'-Azobis[2-(2-imidazolin-2-yl)propane]dihydrochloride, having a 10-hour half life temperature of 44° C.); VA-061 (2,2'-Azobis[2-(2-imidazolin-2-yl)propane], having a 10-hour half life temperature of 61° C.); V-50 (2,2'-Azobis(2-methylpropionamidine)dihydrochloride, having a 10-hour half life temperature of 56° C.); VA-057 (2,2'-Azobis[N-(2-carboxyethyl)-2-methylpropionamidine]tetrahydrate, having a 10-hour half life temperature of 57° C.); VA-086 (2,2'-Azobis[2-methyl-N-(2-hydroxyethyl)propionamide], having a 10-hour half life temperature of 86° C.); V-501 (4,4'-Azobis(4-cyanovaleric acid), having a 10-hour half life temperature 69° C.); V-601 (Dimethyl 2,2'-azobis(2-methylpropionate), having a 10-hour half life temperature of 66° C.); and combinations thereof. The azo-containing radical initiator preferably is VA-044, VA-061, VA-50, VA-501, or a combination thereof; more preferably is VA-044, VA-061, VA-50, or a combination thereof; even more preferably is VA-044 and/or VA-061.

Any suitable thio-containing compounds can be used in the invention, so long as it has a water solubility of at least 0.05 gram per 100 g of water at 25±3° C. Examples of preferred thiol-containing compounds include without limitation 2-mercaptoethylamine, 2-mercaptopropylamine, 3-mercaptopropylamine, 2-mercaptobutylamine, 3-mercaptobutylamine, 4-mercaptobutylamine, 1-amino-2-methyl-2-propanethiol hydrochloride, N-methylaminoethanethiol, N-ethylaminoethanethiol, N-methylaminopropanethiol, N-ethylaminopropanethiol, N-methylaminobutanethiol, N-ethylaminobutanethiol, 2-(butylamino)ethanethiol, thioglycolic acid, ammonium thioglycolate, thiolactic acid, mercaptosuccinic acid, 2-mercaptoisobutyric acid, 2-methyl-3-sulfanylpropanoic acid, 4-mercaptobutyric acid, 6-mercaptohexanoic acid, 2-mercaptoethanol, 1-mercapto-2-propanol, 1-thioglycerol, 3-mercapto-1-propanol, 4-mercapto-1-butanol, 3-mercapto-1-hexanol, 4-mercapto-4-methylpentan-2-ol, cysteine; 4-amino-5-mercaptopentanoic acid, 3-mercapto-2-(methylamino)propanoic acid, and combinations thereof.

In accordance with the invention, the water-based polymerizable composition has a pH of from about 3.0 to about 4.5 (preferably from about 3.0 to about 4.2, more preferably from about 3.0 to about 3.7). It is found that it may be necessary to partially neutralize methacrylic acid for achieving high molecular weights. It is believed that the partial neutralization of methacrylic acid may effect the chain growth and resultant polymer's solubility.

Because methacrylic acid has a pKa of from 4.3 to 4.6, an aqueous solution of methacrylic acid would have an acidic pH, e.g., from 2.4 to 2.7, depending upon the concentration of methacrylic acid. To achieve the desired pH, a base (e.g., NaOH, $NH_4OH$, KOH, or combinations thereof) typically needs to be added in the water-based polymerizable composition. Preferably, KOH is used to partially neutralize methacrylic acid (i.e., adjusting pH-value of the water-based polymerizable composition.

In accordance with the invention, the mole ratio of component (a) (i.e., methacrylic acid) to component (b) (i.e., the thiol-containing compound) is at least about 800 (preferably at least about 2000, more preferably at least about 2500, even more preferably at least about 3000) while the molar ratio of component (b) (i.e., the thiol-containing compound) to component (c) (i.e., the azo-containing radical initiator) is from about 1 to about 3.0 (preferably from about 1.05 to about 2.5, more preferably from about 1.1 to about 2.0, even more preferably from about 1.15 to about 1.5).

In accordance with the invention, the polymerization is carried out at a temperature of from about 40° C. to about 90° C. (preferably from about 45° C. to about 75° C., more preferably from about 45° C. to about 65° C.).

A water-based polymerizable composition can be prepared by dissolving all components in water or a water-based solvent system as well known to a person skilled in the art.

Where a water-based solvent system is used in the preparation of a water-based polymerizable composition, one or more water-miscible organic solvents can be used in the invention. Examples of preferred water-miscible organic solvents include without limitation methanol, ethanol, propanol, isopropanol, ethylene glycol, propylene glycol, 1,3-propanediol, 1,2-butanediol, 1,3-butanediol, 1,4-butanediol, 1,5-pentanediol, triethylene glycol, glycerol, 2-butoxyethanol, dimethoxyethane, acetone, acetonitrile, methyl ethyl ketone, diethylene glycol methyl ether, propylene glycol methyl ether, dipropylene glycol methyl ether acetate, and combinations thereof.

The invention, in another aspect, provides a poly(methacrylic acid) obtained according to a process of the invention, more specifically, a poly(methacrylic acid) having a weight average molecular weight of at least at least about 400,000 Daltons (preferably at least about 600,000 Daltons, more preferably at least about 800,000 Daltons, even more preferably at least about 1,000,000 Daltons), a polydispersity index (PDI) of from about 2.0 to about 3.0 (preferably from about 2.0 to about 2.8, more preferably from about 2.0 to about 2.6), and a substituted-alkylthio group of —S—R at an end terminal, wherein R is a linear or branched $C_2$-$C_{10}$-alkyl group including one or two functional groups selected from the group consisting of —OH, —COOH, —NH$_2$, —NHCH$_3$, —NHC$_2$H$_5$, and combinations thereof.

A high molecular weight poly(methacrylic acid) produced according to a method of the invention can find particular use in forming a reactive base coating on contact lenses in a process for producing water gradient contact lenses as described in U.S. Pat. No. 8,529,057.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A process for producing a poly(methacrylic acid) having a weight average molecular weight of at least about 200,000 Daltons, comprising the steps of:
   (1) obtaining a water-based polymerization composition which comprises (a) methacrylic acid in an amount of from about 1% to about 20% by weight relative to the water-based polymerizable composition, (b) at least one azo-containing radical initiator which has a water solubility of at least 0.05 gram per 100 g of water at 25±3° C. and a 10-hour half life temperature of from about 40° C. to about 90° C., (c) a thiol-containing compound as a chain-transferring agent, and (d) water, wherein the water-based polymerizable composition has a pH of from about 3.0 to about 4.5, wherein the mole ratio of component (a) to component (b) is at least about 800 while the molar ratio of component (b) to component (c) is from about 1 to about 3.0; and
   (2) thermally polymerizing methacrylic acid in the water-based polymerizable composition at a temperature of from about 40° C. to about 90° C. to obtain the poly(methacrylic acid).

2. The process of embodiment 1, wherein the poly(methacrylic acid) has a weight average molecular weight of at least about 400,000 Daltons.

3. The process of embodiment 1, wherein the poly(methacrylic acid) has a weight average molecular weight of at least about 600,000 Daltons.

4. The process of embodiment 1, wherein the poly(methacrylic acid) has a weight average molecular weight of at least about 800,000 Daltons.

5. The process of any one of embodiments 1 to 4, wherein the methacrylic acid is present in the water-based polymerizable composition in an amount of from about 1.5% to about 15%, by weight relative to the water-based polymerizable composition.

6. The process of any one of embodiments 1 to 4, wherein the methacrylic acid is present in the water-based polymerizable composition in an amount of from about 2% to about 10% by weight relative to the water-based polymerizable composition.

7. The process of any one of embodiments 1 to 4, wherein the methacrylic acid is present in the water-based polymerizable composition in an amount of from about 3% to about 8% by weight relative to the water-based polymerizable composition.

8. The process of any one of embodiments 1 to 7, wherein said at least one azo-containing radical initiator has a 10-hour half life temperature of from about 40° C. to about 80° C.

9. The process of any one of embodiments 1 to 7, wherein said at least one azo-containing radical initiator has a 10-hour half life temperature of from about 40° C. to about 70° C.

10. The process of any one of embodiments 1 to 7, wherein said at least one azo-containing radical initiator has a 10-hour half life temperature of from about 40° C. to about 65° C.

11. The process of any one of embodiments 1 to 10, wherein the water-based polymerizable composition has a pH of from about 3.0 to about 4.2.

12. The process of any one of embodiments 1 to 10, wherein the water-based polymerizable composition has a pH of from about 3.0 to about 3.7.

13. The process of any one of embodiments 1 to 12, wherein the mole ratio of component (a) to component (b) is at least about 2000.

14. The process of any one of embodiments 1 to 12, wherein the mole ratio of component (a) to component (b) is at least about 2500.

15. The process of any one of embodiments 1 to 12, wherein the mole ratio of component (a) to component (b) is at least about 3000.

16. The process of any one of embodiments 1 to 15, wherein the molar ratio of component (b) to component (c) is from about 1.05 to about 2.5, more preferably from about 1.1 to about 2.0, even more preferably from about 1.15 to about 1.5.

17. The process of any one of embodiments 1 to 15, wherein the molar ratio of component (b) to component (c) is from about 1.1 to about 2.0.

18. The process of any one of embodiments 1 to 15, wherein the molar ratio of component (b) to component (c) is from about 1.15 to about 1.5.

19. The process of any one of embodiments 1 to 18, wherein the step of thermally polymerizing is carried out at a temperature of from about 40° C. to about 80° C.

20. The process of any one of embodiments 1 to 18, wherein the step of thermally polymerizing is carried out at a temperature of from about 40° C. to about 70° C.

21. The process of any one of embodiments 1 to 18, wherein the step of thermally polymerizing is carried out at a temperature of from about 40° C. to about 65° C.

22. The process of any one of embodiments 1 to 21, wherein the thio-containing compound is selected from the group consisting of 2-mercaptoethylamine, 2-mercaptopropylamine, 3-mercaptopropylamine, 2-mercaptobutylamine, 3-mercaptobutylamine, 4-mercaptobutylamine, 1-amino-2-methyl-2-propanethiol hydrochloride, N-methylaminoethanethiol, N-ethylaminoethanethiol, N-methylaminopropanethiol, N-ethylaminopropanethiol, N-methylaminobutanethiol, N-ethylaminobutanethiol, 2-(butylamino)ethanethiol, thioglycolic acid, ammonium thioglycolate, thiolactic acid, mercaptosuccinic acid, 2-mercaptoisobutyric acid, 2-methyl-3-sulfanylpropanoic acid, 4-mercaptobutyric acid, 6-mercaptohexanoic acid, 2-mercaptoethanol, 1-mercapto-2-propanol, 1-thioglycerol, 3-mercapto-1-propanol, 4-mercapto-1-butanol, 3-mercapto-1-hexanol, 4-mercapto-4-methylpentan-2-ol, cysteine; 4-amino-5-mercapto-pentanoic acid, 3-mercapto-2-(methylamino)propanoic acid, and combinations thereof.

23. The process of any one of embodiments 1 to 21, wherein the thio-containing compound is 2-mercaptoethylamine.

24. The process of any one of embodiments 1 to 23, wherein the pH is achieved by adding a base selected from the group consisting of NaOH, NH$_4$OH, KOH, and combinations thereof.

25. The process of any one of embodiments 1 to 23, wherein the pH is achieved by adding KOH.

26. A poly(methacrylic acid) obtained according to a process of any one of embodiments 1 to 25.

27. A poly(methacrylic acid), having: a weight average molecular weight of at least about 400,000 Daltons, a polydispersity index (PDI) of from about 2.0 to about 3.0, and a substituted-alkylthio group of —S—R at an end terminal, wherein R is a linear or branched $C_2$-$C_{10}$-alkyl group including one or two functional groups selected from the group consisting of —OH, —COOH, —NH$_2$, —NHCH$_3$, —NHC$_2$H$_5$, and combinations thereof.

28. The poly(methacrylic acid) of embodiment 27, wherein the pol(methacrylic acid) has a weight average molecular weight of at least at least about 600,000 Daltons.

29. The poly(methacrylic acid) of embodiment 27, wherein the pol(methacrylic acid) has a weight average molecular weight of at least at least about 800,000 Daltons.

30. The poly(methacrylic acid) of embodiment 27, wherein the pol(methacrylic acid) has a weight average molecular weight of at least at least about 1,000,000 Daltons.

31. The poly(methacrylic acid) of any one of embodiments 27 to 30, wherein the pol(methacrylic acid) has a polydispersity of from about 2.0 to about 2.8.

32. The poly(methacrylic acid) of any one of embodiments 27 to 30, wherein the pol(methacrylic acid) has a polydispersity of from about 2.0 to about 2.6.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

In first step methacrylic acid was polymerized using 2-mercaptoethanol as CTA and VA-044 as radical initiator to obtain poly(methacrylic acid) according to the scheme shown below.

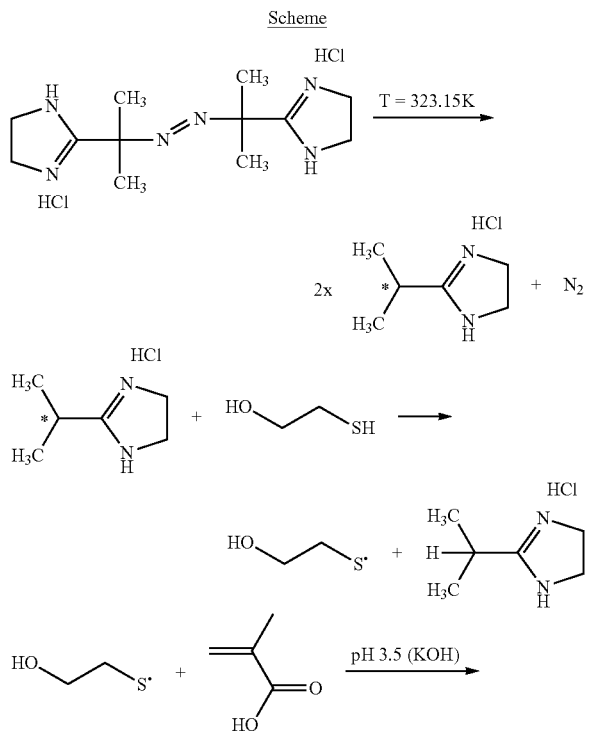

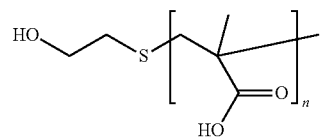

The synthesis was carried out as follows. 1000 g methacrylic acid, an amount (specified in Table 1) of 2-mercaptoethanol were added into a 20 L double jacket reactor and dissolved in a specified amount (Table 1) of water. 200 g of 25 wt % potassium hydroxide solution were added to adjust the pH to 3.5. The oxygen was removed by purging the solution with nitrogen for 2 h. Afterwards the solution was heated to 50° C. Reaching the target temperature, the synthesis was started by adding a specified amount (Table 1) of initiator (2,2'-Azobis[2-(2-imidazolin-2-yl) propane] dihydrochloride, VA-044). The solution was stirred overnight (at least about 18 hours). To stop the polymerization, the solution was cooled to room temperature.

For removal of residuals, the solution was diluted to 3% total solids and transferred to an ultrafiltration device. The ultrafiltration was performed with a 10 kDa cellulose based membrane. Solution was exchanged in total 14× with di water. During first 6 exchanges the pH was maintained at 3.0 by periodic addition of 10 wt % sulfuric acid. The GPC-MALS analysis of the gathered polymer. The results are reported in Table 1.

TABLE 1

| Component | Synthesis # | | |
|---|---|---|---|
| | 1-1 | 1-2 | 1-3 |
| MAA (g) | 1000.00 | 1000.00 | 1000.00 |
| βME (g) | 0.23 | 0.19 | 0.29 |
| VA-044 (g) | 0.78 | 0.65 | 0.99 |
| Water (g) | 19019.18 | 19015.87 | 19024.22 |
| 25 wt % KOH aq. sol. (g) | 200.00 | 200.00 | 200.00 |
| [MAA] (wt %) | 5 | 5 | 5 |
| [MAA]/[βME] mol/mol | 3947 | 4778 | 3130 |
| [βME]/[VA-044] mol/mol | 1.2201 | 1.2093 | 1.2123 |
| Mn (kDa) | 605 | 907 | 510 |
| Mw (kDa) | 1432 | 1970 | 1156 |
| PDI (Mw/Mn) | 2.37 | 2.17 | 2.26 |

Example 2

Several batches of PMAAs were prepared by polymerizing a polymerizable composition listed in Table 2 according to the procedure similar to what is described in Example 1, except that the polymerization temperature is about 90° C. The resultant polymers are purified by ultrafiltration as described in Example 1. The results are reported in Table 2.

TABLE 2

| Components | Synthesis # | | | | | | | |
|---|---|---|---|---|---|---|---|---|
| | 2-1 | 2-2 | 2-3 | 2-4 | 2-5 | 2-6 | 2-7 | 2-8 |
| MAA g | 8.0 | 13.0 | 8.0 | 13.0 | 8.0 | 13.0 | 8.0 | 13.0 |
| βME g | | | | 0.012 | | 0.012 | | 0.012 |
| VA-086 g | 0.033 | 0.054 | 0.022 | 0.036 | 0.022 | 0.036 | 0.022 | 0.036 |
| Water g | 790 | 243 | 789 | 243 | 789 | 243 | 789 | 243 |
| [MAA]/[βME] mol/mol | | | | 1000 | | 1000 | | 1000 |
| [MAA]/[VA-086] mol/mol | 800 | 800 | 1200 | 1200 | 1200 | 1200 | 1200 | 1200 |
| [βME]/[VA-086] mol/mol | 0 | 0 | 0 | 1.2 | 0 | 1.2 | 0 | 1.2 |
| [MAA] wt % | 1 | 5 | 1 | 5 | 1 | 5 | 1 | 5 |
| pH | 2.7 | 2.4 | 2.7 | 2.4 | 3.0* | 3.0* | 9* | 9* |
| Mn (kD) | 188 | | 291 | 201 | 305 | 187 | 116 | 91 |
| Mw (kD) | 605 | | 918 | 579 | 884 | 526 | 539 | 209 |
| PDI (Mw/Mn) | 3.21 | | 3.15 | 2.88 | 2.90 | 2.81 | 4.65 | 2.3 |

*pH of the polymerizable composition was adjusted with NaOH.

Example 3

Several batches of PMAAs were prepared by polymerizing a polymerizable composition listed in Table 3 according to the procedure similar to what is described in Example 1, except that the polymerization temperature is listed in Table 3. The resultant polymers are purified by ultrafiltration as described in Example 1. The results are reported in Table 3.

TABLE 3

| Components | Synthesis # | | | | |
|---|---|---|---|---|---|
| | 3-1 | 3-2 | 3-3 | 3-4 | 3-5 |
| MAA (g) | 15.0 | 15.0 | 15.0 | 30.0 | 15.0 |
| βME (g) | 0.014 | 0.007 | 0.014 | 0.027 | 0.014 |
| VA-086 (g) | 0.021 | 0.021 | 0.042 | 0.084 | |
| VA-061 (g) | 0.036 | | | | |
| Water (g) | 285 | 285 | 135 | 120 | 285 |
| [MAA]/[βME] (mol/mol) | 1000 | 1200 | 1000 | 1000 | 1000 |
| [βME]/[RI] (mol/mol) | 2.4 | 1.2 | 1.2 | 1.2 | 1.2 |
| [MAA] (wt %) | 5 | 5 | 10 | 20 | 5 |

TABLE 3-continued

| Components | Synthesis # | | | | |
|---|---|---|---|---|---|
| | 3-1 | 3-2 | 3-3 | 3-4 | 3-5 | p.s. RI stands for radical initiator.

| pH | 3.5 | 3.5 | 3.5 | 3.5 | 3.5 |
| Polymerization T (° C.) | 90 | 90 | 90 | 90 | 50 | p.s., pH of the polymerizable composition was adjusted with NaOH.

| Mn (kD) | 194 | 293 | 180 | 331 | 204 |
| Mw (kD) | 516 | 775 | 454 | 543 | 660 |
| PDI (Mw/Mn) | 2.66 | 2.65 | 2.52 | 1.64 | 3.24 |
| Yield (%) | 86 | 87 | 86 | 52 | 93 |

Example 4

Several batches of PMAAs were prepared by polymerizing a polymerizable composition (not water-based) listed in Table 4 according to the procedure similar to what is described in Example 1, except that the polymerization temperature is listed in Table 4. The resultant polymers are purified by ultrafiltration as described in Example 1. The results are reported in Table 4.

TABLE 4

| Components | Synthesis # | | | | | |
|---|---|---|---|---|---|---|
| | 4-1 | 4-2 | 4-3 | 4-4 | 4-5 | 4-6 |
| MAA (g) | 15.0 | 15.0 | 15.0 | 15.0 | 15.0 | 15.0 |
| βME (g) | 0.0140 | | | | | 0.0140 |
| V-601 (g) | 0.0334 | 0.0334 | 0.0334 | | | |
| VA-061 (g) | | | | 0.0364 | 0.0364 | 0.0364 |
| Ethyl Acetate (g) | 286 | | | | | |
| Methanol (g) | | 286 | | 286 | | |
| Ethanol (g) | | | 286 | | 286 | 286 |
| [MAA]/[βME] (mol/mol) | 1000 | | | | | 1000 |
| [βME]/[RI] (mol/mol) | 1.2 | 0 | 0 | 0 | 0 | 1.2 |
| [MAA] (wt %) | 4.98 | 4.99 | 4.99 | 4.99 | 4.99 | 4.98 |
| Polymerization T (° C.) | 70 | 64 | 70 | 64 | 70 | 70 |
| Mn (kD) | | 60 | 50 | 21 | 23 | 21 |
| Mw (kD) | | 146 | 123 | 80 | 110 | 76 |
| PDI (Mw/Mn) | | 2.43 | 2.46 | 3.81 | 4.78 | 3.62 |
| Yield (%) | 79 | 50 | 35 | 30 | 29 | 30 | p.s RI stands for radical initiator.

Example 5

Three batches of PMAAs were prepared by polymerizing a polymerizable composition listed in Table 5 according to the procedure similar to what is described in Example 1, except that the polymerization temperature is about 68° C. The resultant polymers are purified by ultrafiltration as described in Example 1. The results are reported in Table 5.

TABLE 5

| Components | Synthesis # | | |
|---|---|---|---|
| | 5-1 | 5-2 | 5-3 |
| MAA (g) | 15.0 | 30.0 | 15.0 |
| VA-061 (g) | 0.0363 | 0.0727 | 0.0091 |
| Ethanol (g) | 135 | 120 | 135 |
| [MAA]/[VA-061] (mol/mol) | 1200 | 1200 | 4800 |
| [MAA] (wt %) | 9.98 | 19.95 | 9.99 |
| Mn (kD) | 88 | 141 | 132 |
| Mw (kD) | 169 | 293 | 253 |
| PDI (Mw/Mn) | 1.92 | 2.08 | 1.92 |
| Yield (%) | 43 | 50 | 22 |

Example 6

Three batches of PMAAs were prepared by polymerizing a polymerizable composition listed in Table 6 according to the procedure similar to what is described in Example 1. The resultant polymers are purified by ultrafiltration as described in Example 1. The results are reported in Table 6.

TABLE 6

| Components | Synthesis # | | |
|---|---|---|---|
| | 6-1 | 6-2 | 6-3 |
| MAA (g) | 15.0 | 15.0 | 15.0 |
| βME (g) | 0.0030 | 0.0030 | 0.0030 |
| VA-061 (g) | 0.0091 | 0.0091 | 0.0091 |
| Water (g) | 270.7 | 271 | 272 |
| Base for adjusting pH | 14.3 (NaOH) | 13.8 (NH$_3$) | 13.26 (KOH) |
| [MAA]/[βME] (mol/mol) | 4000 | 4000 | 4000 |
| [βME]/[RI] (mol/mol) | 1.2 | 1.2 | 1.2 |
| [MAA] (wt %) | 5 | 5 | 5 |
| pH | 3.5 | 3.5 | 3.5 |
| Mn (kD) | 603 | 733 | 743 |
| Mw (kD) | 1568 | 1886 | 1904 |
| PDI (Mw/Mn) | 2.60 | 2.57 | 2.56 |
| Yield (%) | 97 | 96 | 95 |

Example 7

Three batches of PMAAs were prepared by polymerizing a polymerizable composition listed in Table 7 according to the procedure similar to what is described in Example 1, to study the effects of the geometry of stirring means. The resultant polymers are purified by ultrafiltration as described in Example 1. The results are reported in Table 7.

TABLE 7

| Components | Synthesis # | | |
|---|---|---|---|
| | 7-1 | 7-2 | 7-3 |
| MAA (g) | 500.0 | 500.0 | 500.0 |
| βME (g) | 0.1130 | 0.1130 | 0.0030 |
| VA-061 (g) | 0.3029 | 0.3029 | 0.3029 |
| Water (g) | 9507.0 | 9507.0 | 9507.0 |
| [MAA]/[βME] (mol/mol) | 4000 | 4000 | 4000 |
| [βME]/[RI] (mol/mol) | 1.2 | 1.2 | 1.2 |
| [MAA] (wt %) | 5 | 5 | 5 |
| pH* | 3.5 | 3.5 | 3.5 |
| Stirring Geormetry | Propeller agitator | Propeller agitator with flow breaker | Anchor agitator |
| Mn (kD) | 646 | 771 | 714 |
| Mw (kD) | 1479 | 1572 | 1703 |
| PDI (Mw/Mn) | 2.29 | 2.04 | 2.39 |
| Yield (%) | | 76 | 87 |

*The pH of the polymerizable composition was adjusted with NaOH.

Example 8

Three batches of PMAAs were prepared by polymerizing a polymerizable composition listed in Table 8 according to the procedure similar to what is described in Example 1. The resultant polymers are purified by ultrafiltration as described in Example 1.

TABLE 8

| Components | Synthesis # | | |
|---|---|---|---|
| | 8-1 | 8-2 | 8-3 |
| MAA (g) | 15.0 | 15.0 | 15.0 |
| βME (g) | 0.0068 | 0.0034 | 0.0017 |
| VA-061 (g) | 0.0182 | 0.0091 | 0.0045 |
| Water (g) | 285.0 | 285.0 | 285.0 |
| [MAA]/[βME] (mol/mol) | 2000 | 4000 | 6000 |
| [βME]/[RI] (mol/mol) | 1.2 | 1.2 | 1.2 |
| [MAA] (wt %) | 5 | 5 | 5 |
| pH* | 3.5 | 3.5 | 3.5 |

*The pH of the polymerizable composition was adjusted with NaOH.

All the publications, patents, and patent application publications, which have been cited herein above in this application, are hereby incorporated by reference in their entireties.

What is claimed is:

1. A poly(methacrylic acid), having: a weight average molecular weight of at least 400,000 Daltons, a polydispersity index (PDI) of from about 2.0 to about 3.0, and a substituted-alkylthio group of —S—R at an end terminal, wherein R is a linear or branched $C_2$-$C_{10}$-alkyl group including one or two functional groups selected from the group consisting of —OH, —COOH, —NH$_2$, —NHCH$_3$, —NHC$_2$H$_5$, and combinations thereof.

2. The poly(methacrylic acid) of claim 1, wherein the pol(methacrylic acid) has a weight average molecular weight of at least about 600,000 Daltons.

3. The poly(methacrylic acid) of claim 2, wherein the pol(methacrylic acid) has a polydispersity of from about 2.0 to about 2.8.

4. The poly(methacrylic acid) of claim 2, wherein the pol(methacrylic acid) has a polydispersity of from about 2.0 to about 2.6.

5. The poly(methacrylic acid) of claim 1, wherein the pol(methacrylic acid) has a weight average molecular weight of at least about 800,000 Daltons.

6. The poly(methacrylic acid) of claim 5, wherein the pol(methacrylic acid) has a polydispersity of from about 2.0 to about 2.8.

7. The poly(methacrylic acid) of claim 5, wherein the pol(methacrylic acid) has a polydispersity of from about 2.0 to about 2.6.

8. The poly(methacrylic acid) of claim 1, wherein the pol(methacrylic acid) has a weight average molecular weight of at least about 1,000,000 Daltons.

9. The poly(methacrylic acid) of claim 8, wherein the pol(methacrylic acid) has a polydispersity of from about 2.0 to about 2.8.

10. The poly(methacrylic acid) of claim 8, wherein the pol(methacrylic acid) has a polydispersity of from about 2.0 to about 2.6.

11. The poly(methacrylic acid) of claim 1, wherein R is a linear or branched $C_2$-$C_{10}$-alkyl group including one or two functional groups which are —OH.

12. The poly(methacrylic acid) of claim 1, wherein R is a linear or branched $C_2$-$C_{10}$-alkyl group including one or two functional groups which are —COOH.

13. The poly(methacrylic acid) of claim 1, wherein R is a linear or branched $C_2$-$C_{10}$-alkyl group including one or two functional groups which are —$NH_2$.

14. The poly(methacrylic acid) of claim 1, wherein R is a linear or branched $C_2$-$C_{10}$-alkyl group including one or two functional groups which are —$NHCH_3$.

15. The poly(methacrylic acid) of claim 1, wherein R is a linear or branched $C_2$-$C_{10}$-alkyl group including one or two functional groups which are —$NHC_2H_5$.

* * * * *